(12) United States Patent
Delts

(10) Patent No.: US 6,790,261 B1
(45) Date of Patent: Sep. 14, 2004

(54) FILTER FRAME AND METHOD

(76) Inventor: Glenwood Delts, 2603 Azalea Dr., Greensboro, NC (US) 27407

( * ) Notice: Subject to any disclaimer, the term of this patent is extended or adjusted under 35 U.S.C. 154(b) by 0 days.

(21) Appl. No.: 10/243,140

(22) Filed: Sep. 13, 2002

(51) Int. Cl.[7] ............................................. B01D 46/10
(52) U.S. Cl. .............................. 95/273; 55/496; 55/501; 55/DIG. 31
(58) Field of Search ............................. 95/273; 55/482, 55/487, 494, 496, 501, 505, 506, DIG. 31

(56) References Cited

U.S. PATENT DOCUMENTS

| | | | |
|---|---|---|---|
| 1,122,437 A | * 12/1914 | Sweeney ...................... 55/496 |
| 1,737,532 A | 11/1929 | Allen |
| 2,175,903 A | * 10/1939 | Lichtman ...................... 55/496 |
| 2,624,405 A | * 1/1953 | Lynch .......................... 55/496 |
| 2,639,004 A | * 5/1953 | McIntyre ...................... 55/496 |
| 3,274,759 A | * 9/1966 | Bell, Jr. ........................ 55/496 |
| 4,115,082 A | 9/1978 | Newell |
| 4,175,933 A | 11/1979 | James |
| 4,333,752 A | 6/1982 | Thies et al. |
| 4,518,402 A | 5/1985 | Dargel |
| 4,749,390 A | 6/1988 | Burnett et al. |
| 5,133,789 A | * 7/1992 | Smith .......................... 55/496 |
| 5,188,646 A | * 2/1993 | Nolen, Jr. ..................... 55/496 |
| 5,240,487 A | 8/1993 | Kung |
| 5,462,569 A | * 10/1995 | Benjamin .............. 55/DIG. 31 |
| 5,476,526 A | * 12/1995 | Attermeyer .................. 55/496 |
| 5,492,551 A | * 2/1996 | Wolfe .......................... 55/496 |
| 5,772,713 A | * 6/1998 | Salinas et al. ................ 55/496 |
| 5,906,677 A | 5/1999 | Dudley |
| 5,968,217 A | * 10/1999 | Stein et al. ................... 55/496 |
| 6,152,980 A | * 11/2000 | Culwell ....................... 55/496 |
| 6,257,976 B1 | 7/2001 | Richardson, III |

* cited by examiner

Primary Examiner—Duane Smith
Assistant Examiner—Jason M. Greene

(57) ABSTRACT

A rigid frame is provided for a conventional air filter as used in ductwork of air handling systems in homes, buildings and the like. The frame includes a first section having a series of apertures and a second section slideably mounted thereto. The second section likewise includes a series of apertures for air passage. The method describes placing a conventional filter in the filter frame and adjusting its length to accommodate the selected filter, the filter can then be placed within the air handling system in a usual seat without fear of dislodgement due to flexing or bending of the air filter when it becomes loaded with dust and debris.

16 Claims, 7 Drawing Sheets

FILTER FRAME AND METHOD

FIELD OF THE INVENTION

The invention herein pertains to replaceable air filters and particularly pertains to an adjustable frame used to maintain air filters in place in air passageways.

DESCRIPTION OF THE PRIOR ART AND OBJECTIVES OF THE INVENTION

Many heating and air conditioning systems in homes, office buildings and the like utilize replaceable air filters for collection of dust, pollen, debris and the like. These replaceable filters usually employ fiberglass strands contained by a cardboard edging. As such they are relatively inexpensive and are somewhat flimsy in construction. Most heating and air conditioning manufacturers recommend the air filters be changed once a month to ensure proper system operation and to provide the necessary filtering capacity. Standard filters come in a variety of lengths and widths, generally measured in inches with a standard thickness of one inch. While other sizes, thicknesses and dimensions are used, the one inch thickness is recognized as an industry standard.

Also, "non-woven" fabrics have been devised which are of a relatively stiff nature and require no outer frame, as opposed to fiberglass filters which have a relatively stiff paper outer edge. Regardless of the type of conventional filter used, homeowners, building managers and maintenance men and the like have all experienced filters being dislodged from the filter "seat" in the ductwork and drawn or forced along the ductwork to a corner or other location thus requiring manual extraction. Inadvertent dislodgement of the filter allows air to flow without filtering and can create mechanical problems to the air system and health problems to the individuals affected.

The reason for accidental filter dislodgement is often a direct result of the flimsy nature of conventional air filters. As a filter becomes loaded, the air pressure increases on the face of the filter, oftentimes allowing the air stream to carry or remove the filter from its usual seat. Other times conventional air filters are incorrectly installed and are dislocated on system startup or operation.

Thus, based on the problems and disadvantages with seating conventional air filters, it is an objective of the present invention to provide an air filter frame and method which will allow a filter to securely remain in its designated seat within the ductwork of a conventional air handling system.

It is another objective of the invention to provide an air filter frame that requires no tools and which is easy to use and install in the ductwork seat.

It is yet another objective of the invention to provide an air filter frame which can be manufactured which will adjustably contain a number of different size air filters as required.

It is still another objective of the invention to provide an air filter frame which has first and second sections which slidably engage for adjustment purposes.

It is a further objective of the invention to provide an air filter frame which is relatively light in weight and inexpensive to manufacture and distribute.

Various other objectives and advantages of the present invention will become apparent to those skilled in the art as a more detailed description is set forth below.

SUMMARY OF THE INVENTION

The aforementioned and other objectives are realized by providing an air filter frame and method for use formed from a suitable metal such as aluminum, a rigid paper, polymeric material, or combination thereof. The filter frame includes a first section having a rectangular planar back having a plurality of apertures therein. Attached along the edges of the back are sidewalls and an endwall. An upright guide is positioned on the back which is contained within a slot of an upper or second section. The second section likewise includes a rectangular planar back which is sized to fit between the side walls of the first section. The defined guide slot partially extends along the length of the second section and contains the guide. As the slot does not extend the entire length of the second section, when the second section is fully extended from the first section, the end of the slot contacts the guide and terminates the relative movement between the sections, thus preventing the first and second sections from complete disengagement. The back of the second section likewise contains a plurality of circular apertures and an end wall. The second section end wall is in an opposing relation to the first section end wall when the two sections are engaged. The ends and side walls of both sections are at a height to contain the air filter placed therein. By selecting a filter of sufficient width, to fit within the filter frame, the length of the filter frame can be slideably adjusted to accommodate the length of the filter. The method of use includes the steps of placing a conventional filter within the frame, adjusting the frame to the length of the filter by sliding the first and second sections to first an open position for filter placement and then to close the frame to tightly engage the filter therein. Thereafter the filter and frame combination can be placed in an air duct filter seat of a heating or air conditioning system. The frame will stabilize the filter and prevent it from dislodging from its seated position.

DETAILED DESCRIPTION OF THE PREFERRED EMBODIMENT AND OPERATION OF THE INVENTION

Figure 1:
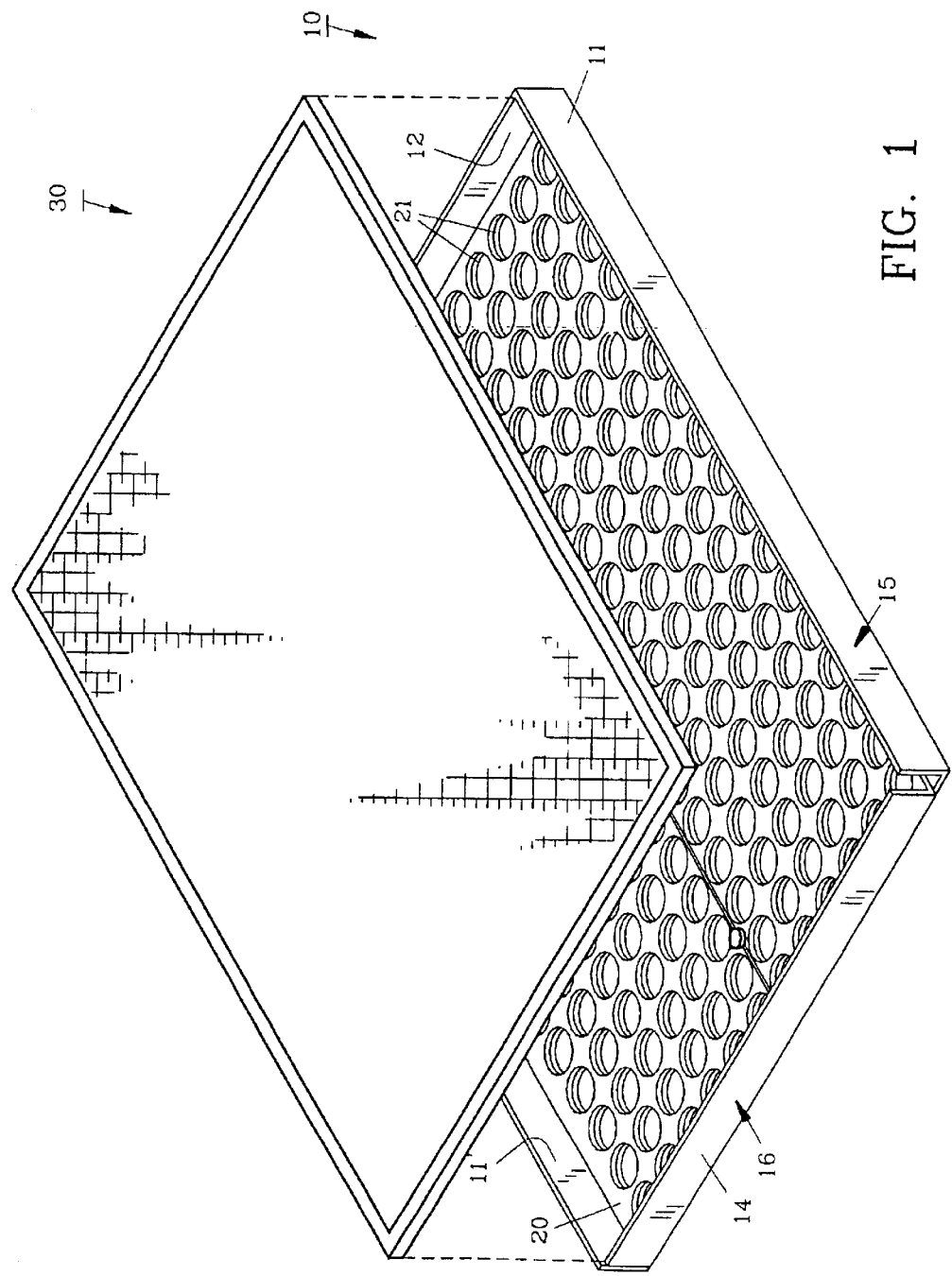
FIG. 1 shows a perspective view of the air filter frame with an air filter removed therefrom.

For a better understanding of the invention and its operation, turning now to the drawings, the preferred form of the invention is shown in FIGS. 1–6 with filter frame 10 shown in a "compact" or closed posture to accommodate conventional fiberglass air filter 30. Preferred filter frame 10 includes first section 15 having a pair of sidewalls 11, 11' which extends upwardly approximately the thickness of air filter 30 and also includes rear wall 12.

Filter frame 10 maybe made of metal, polymeric materials, cardboard or other suitable compositions, but preferably from galvanized metal. In FIG. 1, filter frame 10 includes first section 15 as more clearly seen in FIG. 6 and second section 16 extending from first section 15. First section 15 and second section 16 slideably engage to accommodate air filters such as air filters 30 and 40 having different lengths. Air filter 30 may have a length of for example 14 inches (35.6 cm) whereas air filter 40 may have a length for example of 20 inches (50.8 cm). Air filters 30 and 40 have identical widths and thicknesses as seen in FIGS. 1 and 6.

Figure 2:
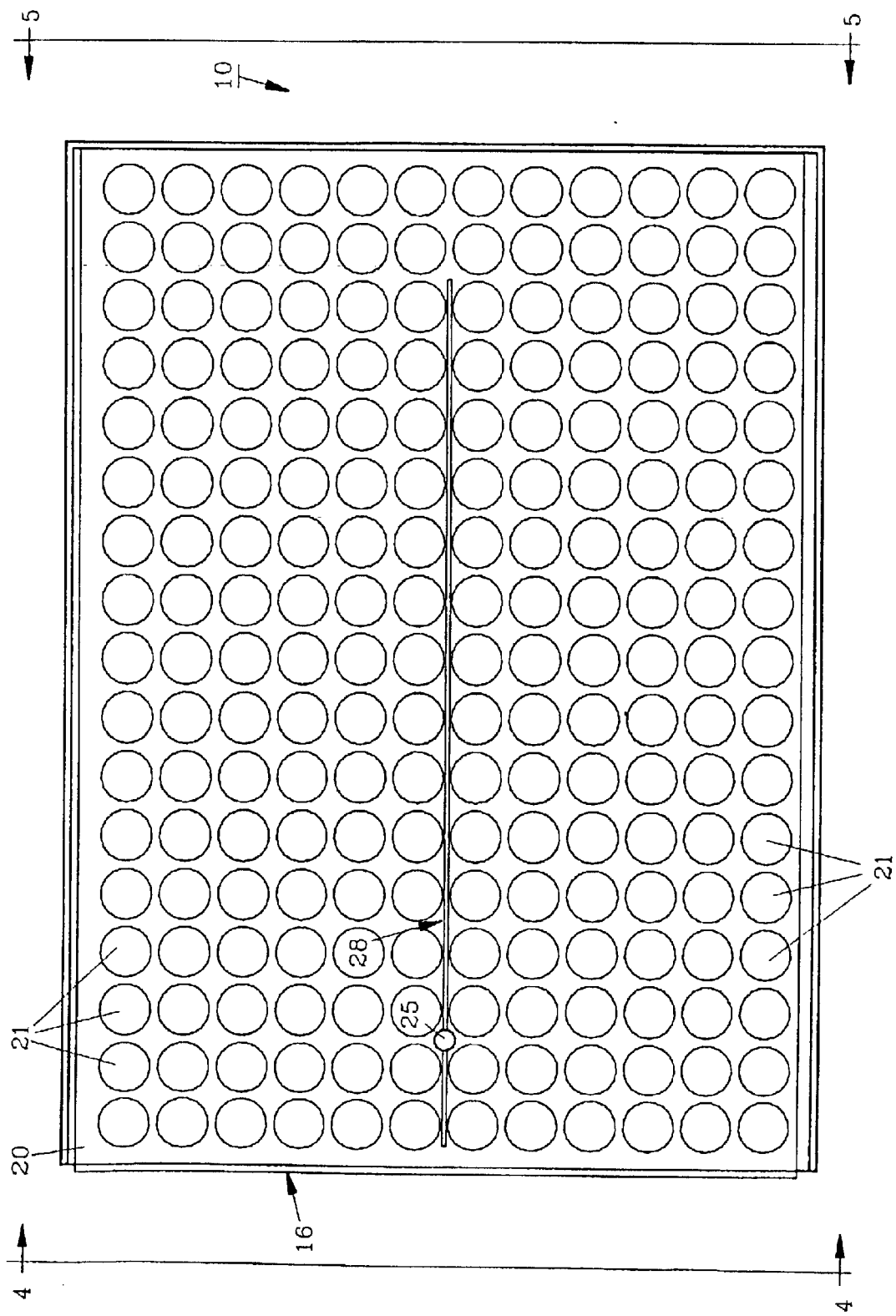
FIG. 2 depicts the top view of the filter frame as seen in FIG. 1.
Figure 3:
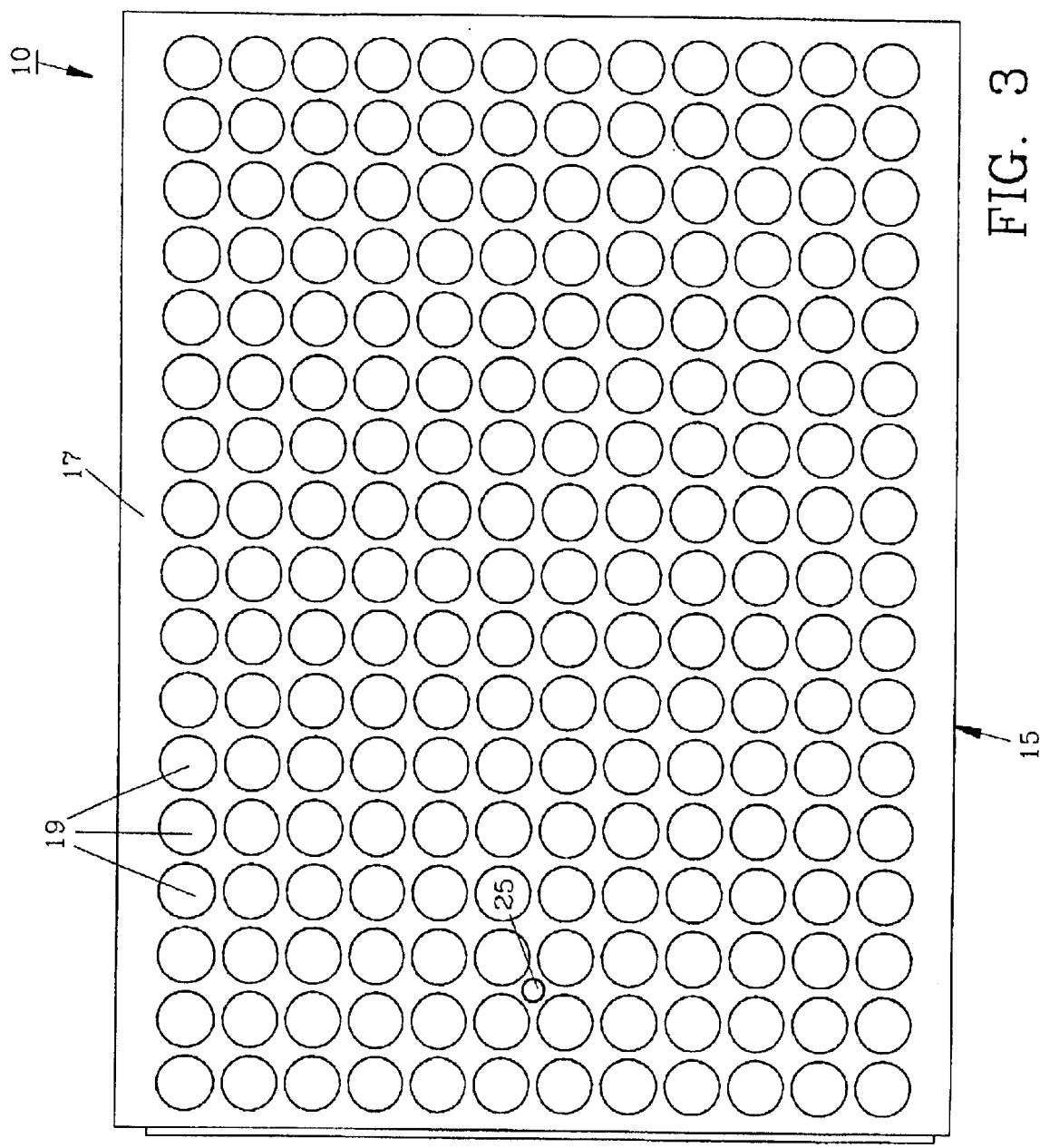
FIG. 3 features a bottom view of the filter frame of FIG. 2.
Figure 4:
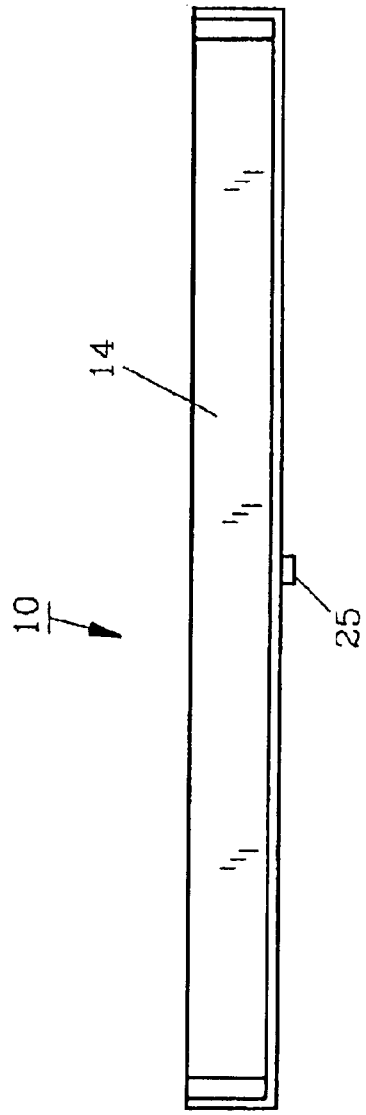
FIG. 4 demonstrates the front elevational view of the filter frame.
Figure 5:
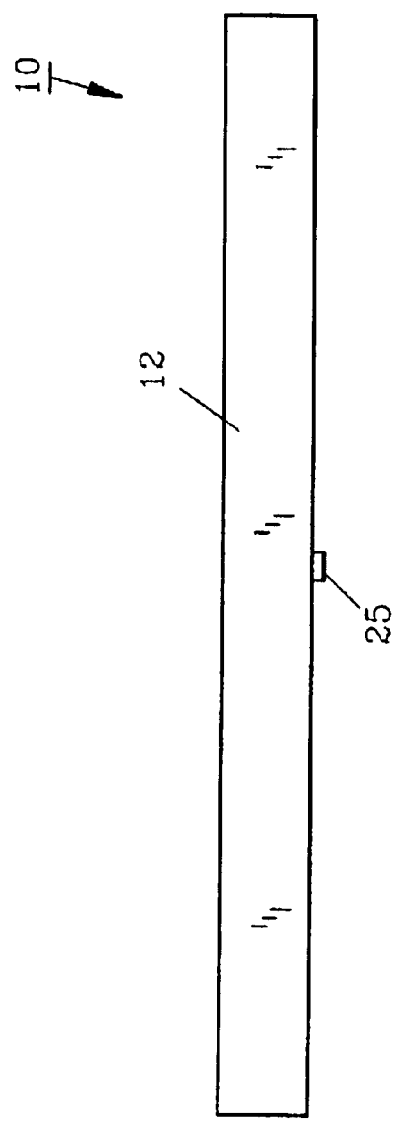
FIG. 5 pictures a side elevational view of the filter frame.

First section 15 includes, in addition to sidewalls 11, 11' and end wall 12 (FIG. 5) planar back 17 as seen in FIG. 3. Back 17 is integrally formed with sidewalls 11, 11' and rear wall 12 preferably, by stamping and bending a galvanized metal sheet or the like. Back 17 (FIG. 3) of first section 15 includes a plurality of circular apertures 19 for air passage as does back 20 of second section 16 as shown in FIG. 2. Apertures 21 within back 20 are coincidentally alignable with apertures 19 of first section 15 for sufficient air flow as shown in FIG. 3 with filter frame 10 in a closed posture as shown in FIG. 1.

Figure 6:
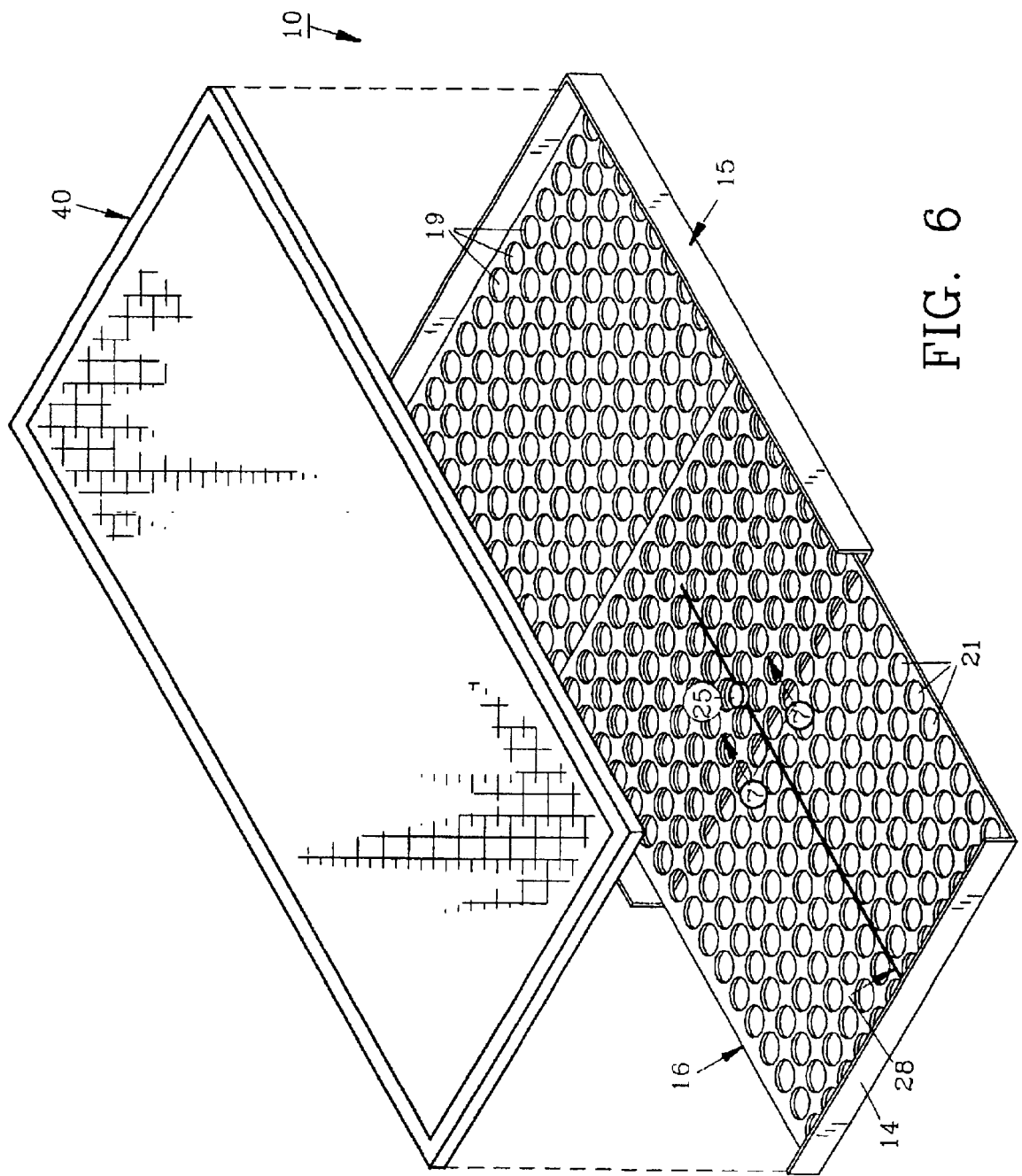
FIG. 6 shows the filter frame in an extended posture for a longer filter than that seen in FIG. 1.
Figure 7:
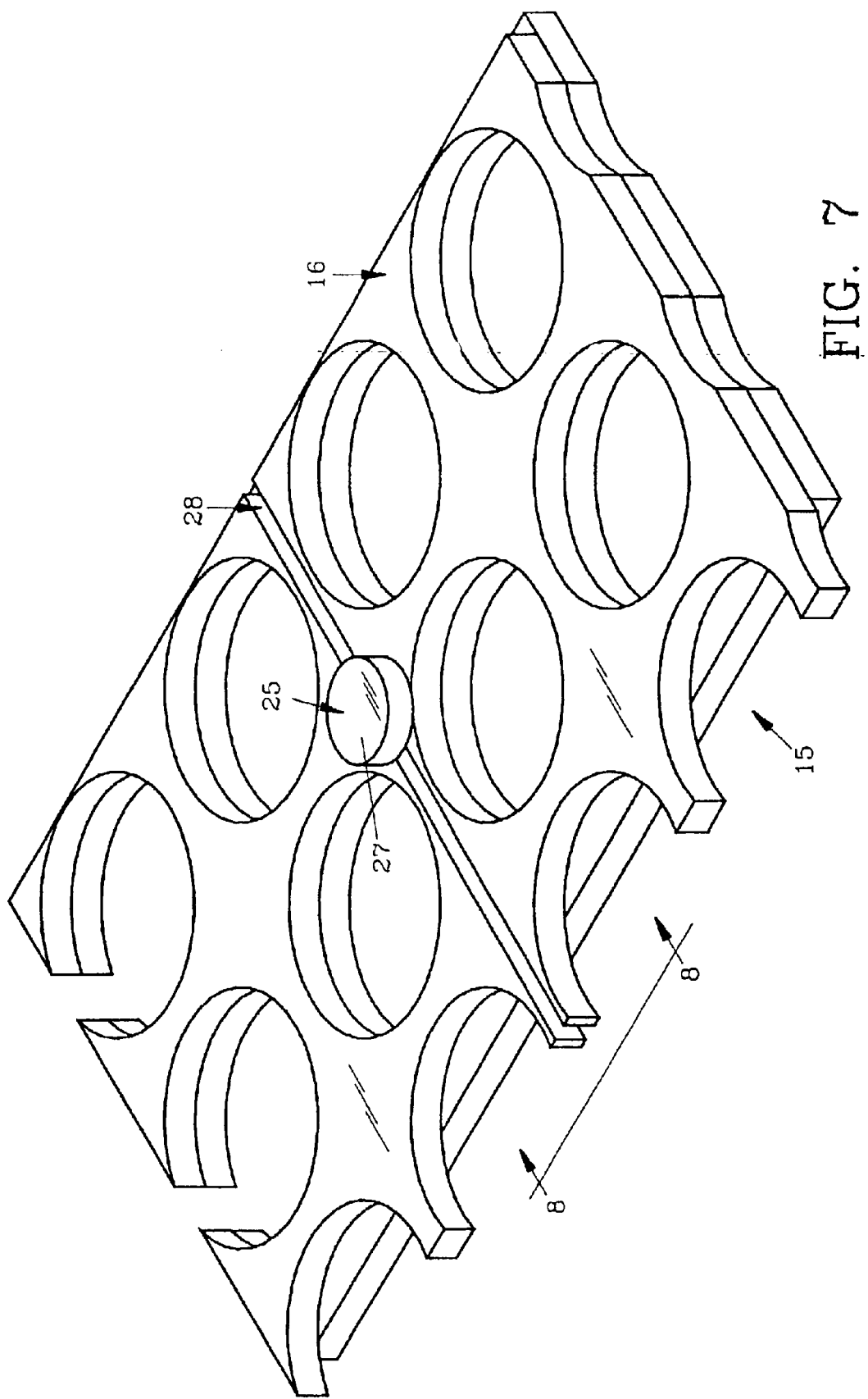
FIG. 7 demonstrates an enlarged sectional view of the filter frame of FIG. 6 along lines 7—7.
Figure 8:
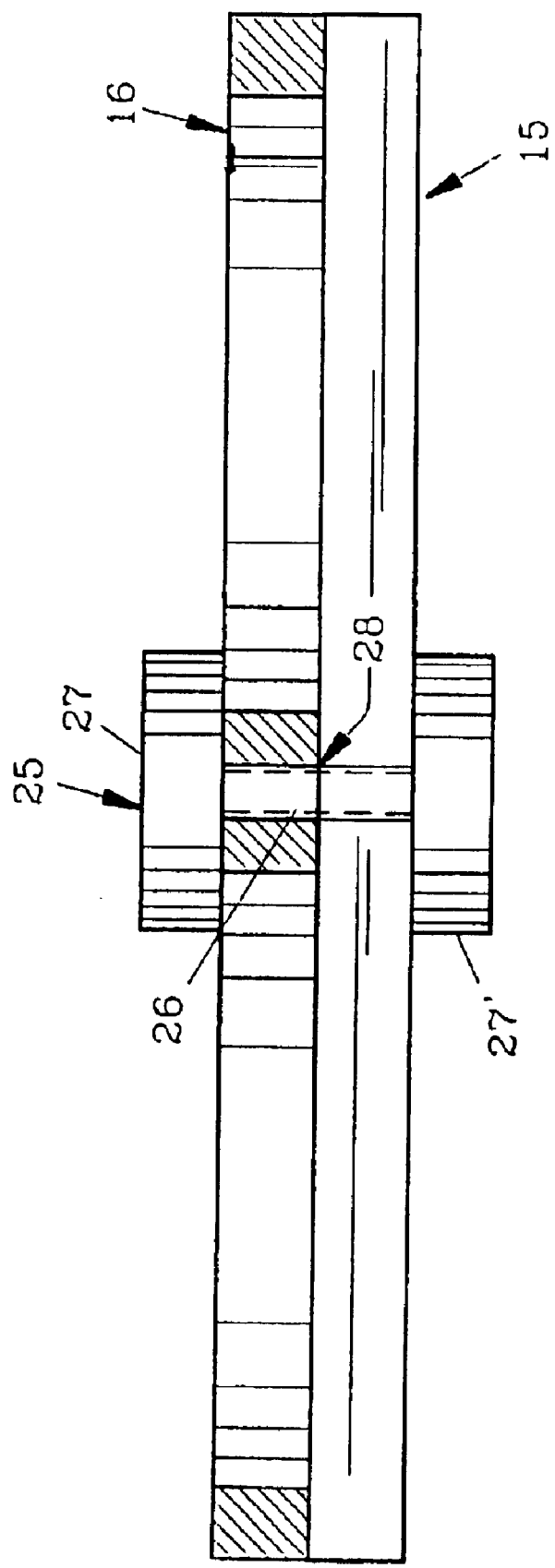
FIG. 8 depicts an enlarged view of the filter frame along lines 8—8 of FIG. 7.

In order to allow first section 15 and second section 16 to easily open and close, guide 25 is provided, shown in FIGS. 7 and 8. Guide 25 consists of post 26, top cap 27 and lower cap 271. Guide 25 is contained within slot 28 of second section 16 and is rigidly affixed to first section 15 as seen in FIGS. 6, 7 and 8. Guide 25 provides for a smooth sliding action between first section 15 and second section 16 and prevents the removal of second section 16 from first section 15 as slot 28 does not extend the full length of second section 16 as shown in FIG. 6. End wall 14 of second section 16 can be used to open or expand filter 10 by manually grasping the same.

While standard filters have different lengths such as filter 40 shown in FIG. 6, second section 16 is slideably extended from first section 15 to thereby accommodate the length of filter selected. Once the filter 40 is within filter frame 10, second section 16 is moveably positioned thereagainst to securely engage filter 40. Once the selected air filter is so engaged, filter frame 10 with the filter are then properly placed in a designated air duct seat of a heating or air conditioning system. Due to the relative htin material used to construct filter frame 10, little if any bulk is added to the filter to enable filter frame 10 to fit the air duct seat without modification thereto. Filter frame 10 prevents the air filter which may have little internal support from collapsing and being pulled into the air duct where its filtering abilities are negated.

The preferred method of the invention provides for supporting a replaceable air filter such as air filter 30 as shown in FIG. 1 within frame 10 on a first section 15 and second section 16 which slideably engage. Other method steps include a) selecting a suitable standard replaceable filter, b) opening frame 10 to accommodate the selected filter by sliding first section 15 relative to second section 16, c) placing the selected filter in opened frame 10 and thereafter, d) closing frame 10 for tight engagement against the filter.

Frame 10 as shown in FIG. 1 will accommodate an air filter having a thickness of approximately 2.54 cm. although other sizes and dimensions could also be accommodated.

The illustrations and examples provided herein are for explanatory purposes and are not intended to limit the scope of the appended claims.

I claim:

1. An adjustable frame for a replaceable air filter comprising: a first section, said first section comprising a planar back, a side wall, said sidewall mounted to said back, said back defining a plurality of apertures for air flow, a second section, said second section comprising a planar back, an end wall, said end wall connected to said planar back, said back defining a plurality of apertures for air flow, said second section slidably received in said first section for adjustment to receive air filters of different sizes.

2. The adjustable frame of claim 1 formed from metal.

3. The adjustable frame of claim 1 formed from a polymeric material.

4. The adjustable frame of claim 1 formed from a paper material.

5. The adjustable frame of claim 1 wherein said first section comprising a pair of sidewalls, an end wall, said end wall joined to each of said side walls, said pair of side walls and said end wall attached to said back.

6. The adjustable frame of claim 5 wherein said second section end wall is positioned opposite said first section end wall.

7. The adjustable frame of claim 1 wherein said first and said second section back apertures comprises circular apertures.

8. An adjustable frame for a replaceable air filter comprising: a first section, said first section comprising a planar back, said planar back defining a series of apertures for air passage, an end wall, a part of opposing side walls, said end wall and said opposing side walls attached to said back, a second section, said second section comprising a planar back defining a series of apertures for air passage, said second section slidably positioned in said first section whereby said apertures of said first section can coincidentally align with said apertures of said second section, said first and said second sections slidably adjustable for supporting air filters of different dimensions.

9. The adjustable frame of claim 8 wherein said second section further comprises an end wall, said second section end wall attached to said second section back in opposing relation to said first section end wall.

10. The adjustable frame of claim 8 formed from metal.

11. The adjustable frame of claim 8 wherein said first section comprising a guide, said second section defining a slot, said guide positioned in said slot.

12. A method of supporting a replaceable air filter to maintain the air filter in an air passageway with an adjustable frame, the frame having first and second sections which slidably adjust, said first and second sections each having an apertured planar back with a wall joined thereto comprising the steps of:

(a) selecting a replaceable filter;

(b) placing the replaceable filter in the frame against the apertured back;

(c) adjusting the frame to engage the replaceable filter; and (d) positioning the frame containing the replaceable filter in an air passageway.

13. The method of claim 12 wherein the step of selecting a replaceable filter comprises selecting a standard filter having a thickness of approximately 2.54 cm.

14. The method of claim 12 wherein the step of placing the filter in the frame comprises the step of opening the frame by sliding the first and second frame sections apart.

15. The method of claim 12 wherein the step adjusting the frame comprises sliding the first and second sections in opposite directions.

16. The method of claim 12 wherein positioning the frame comprises the step of placing the frame in an air duct seat.

\* \* \* \* \*